ically active compounds. More particularly, the invention is concerned with new 3,3-disubstituted azetidines of the formula

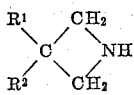

wherein $R^1$ represents hydrogen, lower alkyl, cycloalkyl, phenyl and phenylalkyl radicals, $R^2$ represents lower alkyl, cycloalkyl, phenyl and phenylalkyl radicals, and their mineral acid addition salts.

3,076,799
3-SUBSTITUTED AZETIDINE COMPOUNDS
Emilio Testa, San Simone, Vacallo, Ticino, Switzerland, and Luigi Fontanella and Giulio Maffii, Milan, Italy, assignors to Lepetit S.p.A., Milan, Italy
No Drawing. Filed Dec. 18, 1959, Ser. No. 860,311
Claims priority, application Great Britain Dec. 23, 1958
12 Claims. (Cl. 260—239)

This invention is concerned with new pharmacologically active compounds. More particularly, the invention is concerned with new 3,3-disubstituted azetidines of the formula The compounds of the invention have been found to possess useful pharmacological properties. For instance, the compound 3-phenylazetidine in doses of 1.5 to 3 mg./kg. in laboratory animals causes a very prolonged hypotensive effect, with substantial decrease of the response to adrenaline and noradrenaline. Some of the compounds are active as analgesics such as 3-phenyl-3-butylazetidine, which is active at doses as low as 10 mg./kg. Still others are sympathomimetics, such as 3-phenyl-3-methylazetidine. The toxicity of all compounds is reasonably low, thus allowing the safe administration at the pharmacologically effective doses.

The process for the preparation of these compounds starts from 3-substituted 2-azetidinones according to the reaction

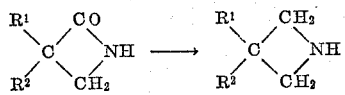

The process consists in bringing together the selected 2-azetidinone and lithium aluminum hydride in a molar ratio of 1 to about 0.8 to 1.5 in an anhydrous inert organic solvent. Although it is intended that the reactants may be reciprocally added in any order, it is preferred to add the selected azetidinone, either alone or dissolved or suspended in the selected reaction solvent, to a suspension of lithium aluminium hydride in the same solvent. At the end of the addition the mixture is heated to reflux for 2–5 hours and the excess hydride is destroyed, for instance, by cautiously adding a small amount of water or of an ammonium chloride solution to the mixture. After extraction with a water insoluble solvent and evaporation of the solvent the product is purified either by distillation or by recrystallisation.

The starting 2-azetidinones can be prepared as described in "Il Farmaco," XIII, February 1958, No. 2, pages 152–163.

The following non-limitative examples are illustrative of the invention.

EXAMPLE 1
3-Phenyl-3-Ethylazetidine

To a suspension of 11 g. of $LiAlH_4$ in 100 ml. of anhydrous ethyl ether a solution of 20 g. of 3-phenyl-3-ethyl-2-azetidinone in 200 ml. of anhydrous ethyl ether is cautiously added, then the mixture is refluxed for 2.5 hours. After cooling 100 ml. of a 10 percent ammonium chloride solution is added taking care that the temperature does not overcome 5°. The mixture is extracted with ethyl ether, the solvent is removed and the residue is distilled collecting at 85–87°/1 mm. Yield 13 g. The hydrochloride melts at 219–20° (dec.).

EXAMPLE 2
3-Phenyl-3-Methylazetidine

Prepared by the procedure described in the preceding examples starting from 16 g. of 3-phenyl-3-methyl-2-azetidinone. Yield 9 g., B.P. 73°/0.9 mm. The hydrochloride melts at 155°.

EXAMPLE 3
3-Phenyl-3-n-Propylazetidine

A solution of 41 g. of 3-phenyl-3-n-propyl-2-azetidinone in 250 ml. of anhydrous diethyl ether is cautiously added to a suspension of 25 g. of $LiAlH_4$ in 250 ml. of anhydrous diethyl ether. The mixture is refluxed for 3 hours, then some drops of aqueous $NH_4Cl$ solution are added at 0° and the mixture is extracted with diethyl ether. The solvent is removed in vacuo and the residue is distilled collecting at 88–90° C./0.4 mm. Yield 28 g. (73.5%).

EXAMPLES 4 to 8

According to the process of the preceding examples the following 3,3-disubstituted azetidines were prepared.

| | 3-substituents | Yield | M.P. or B.P. | M.P. of hydrochlorides, °C. |
|---|---|---|---|---|
| 4 | Phenyl-isopropyl | 75.3 | M.P. 36–38° C. B.P. 81–83° C./0.5 mm | 244–246 |
| 5 | Phenyl-butyl | 73.5 | B.P. 85–90° C./0.2–0.4 mm. | 128–130 |
| 6 | Phenyl-benzyl | 85.5 | M.P. 62–64° C. B.P. 136–138°C./0.2–0.4 mm. | 171–172 |
| 7 | Phenyl-cyclohexyl | 74.5 | M.P. 85–87° C. | 210–211 |
| 8 | Diphenyl | 43 | M.P. 95–96° C. B.P. 160–170°C./1 mm. | 245–247 |

EXAMPLE 9
3-Phenylazetidine

A suspension of 3-phenyl-2-azetidinone in 500 ml. of anhydrous diethyl ether is quickly added to a suspension of 22.5 g. of $LiAlH_4$ in 300 ml. of the same solvent. The mixture is then refluxed for 4 hours, a small amount of aqueous $NH_4Cl$ solution is added and after filtration the reaction mixture is extracted with diethyl ether. The solvent is removed and the residue is distilled collecting at 87–89° C./3–3.5 mm. Yield 58%. The hydrochloride has M.P. 78–80° C.

We claim:
1. 3-phenylazetidine.
2. 3-phenyl-3-n-butylazetidine.
3. 3-phenyl-3-methylazetidine.
4. 3-phenyl-3-ethylazetidine.
5. 3,3-diphenylazetidine.
6. Process for the manufacture of 3-phenyl azetidine, which comprises bringing together 3-phenyl-2-azetidinone and lithium aluminum hydride in a molar ratio of 1 to about 0.8 to 1.5 in an anhydrous inert organic solvent.
7. Process for the manufacture of 3-phenyl-3-n-butylazetidine, which comprises bringing together 3-phenyl-3-n-butyl-2-azetidinone and lithium aluminum hydride in a molar ratio of 1 to about 0.8 to 1.5 in an anhydrous inert organic solvent.

8. Process for the manufacture of 3-phenyl-3-methylazetidine which comprises bringing together 3-phenyl-3-methyl-2-azetidinone and lithium aluminum hydride in a molar ratio of 1 to about 0.8 to 1.5 in an anhydrous inert organic solvent.
9. 3-phenyl-3-n-propylazetidine.
10. 3-phenyl-3-isopropylazetidine.
11. 3-phenyl-3-benzylazetidine.
12. 3-phenyl-3-cyclohexylazetidine.

References Cited in the file of this patent

Chem. Abstracts, vol. 27, page 3914, abstracting Kamppa et al., Ann. Acad. Sci., Fennicae 37A, No. 7, 8 pp. (1933).

Mannich et al.: Berichte, vol. 70, pp. 210–213 (1937).

Gaylord: Reduction With Complex Metal Hydrides, Interscience Publishers, Inc., New York, N.Y., 1956, p. 595.

Noller: Textbook of Organic Chemistry, p. 21 (1958).